United States Patent
Lang

(10) Patent No.: US 12,244,166 B2
(45) Date of Patent: Mar. 4, 2025

(54) CHARGING CASE

(71) Applicant: Goertek Inc., Shandong (CN)

(72) Inventor: Yunsen Lang, Shandong (CN)

(73) Assignee: Goertek Inc., Shandong (CN)

( * ) Notice: Subject to any disclaimer, the term of this patent is extended or adjusted under 35 U.S.C. 154(b) by 500 days.

(21) Appl. No.: 17/623,998

(22) PCT Filed: Sep. 29, 2019

(86) PCT No.: PCT/CN2019/108946
§ 371 (c)(1),
(2) Date: Dec. 30, 2021

(87) PCT Pub. No.: WO2021/031297
PCT Pub. Date: Feb. 25, 2021

(65) Prior Publication Data
US 2022/0352733 A1    Nov. 3, 2022

(30) Foreign Application Priority Data
Aug. 16, 2019    (CN) .......................... 201910759569.9

(51) Int. Cl.
*H02J 7/00*    (2006.01)
*H04R 1/10*    (2006.01)

(52) U.S. Cl.
CPC .......... *H02J 7/0044* (2013.01); *H02J 7/0048* (2020.01); *H02J 7/00716* (2020.01); *H02J 7/007182* (2020.01); *H04R 1/1025* (2013.01); *H02J 2207/20* (2020.01)

(58) Field of Classification Search
None
See application file for complete search history.

(56) References Cited

U.S. PATENT DOCUMENTS 11,431,185 B1 *    8/2022    Feng ...................... H02J 7/007

FOREIGN PATENT DOCUMENTS

| CN | 109088459 A | 12/2018 |
| CN | 109149689 A | 1/2019 |
| CN | 208723600 U | 4/2019 |
| CN | 109768606 A | 5/2019 |
| CN | 110098650 A | 8/2019 |

* cited by examiner

*Primary Examiner* — Arun C Williams
(74) *Attorney, Agent, or Firm* — Baker Botts LLP

(57) ABSTRACT

Disclosed is a charging case, comprising a control module, a charging case battery and a voltage conversion module; the charging case battery is connected with the voltage conversion module; the voltage conversion module is configured for converting a direct current output by the charging case battery into a charging voltage and outputting the charging voltage to a charging management chip of a to-be-charged device so as to charge a battery of the to-be-charged device through the charging management chip; the control module is configured to regulate the charging voltage output by the voltage conversion module according to a voltage of the battery of the to-be-charged device during charging of the battery of the to-be-charged device.

13 Claims, 4 Drawing Sheets

CHARGING CASE

CROSS-REFERENCE TO RELATED APPLICATION

This application is a National Stage of International Application No. PCT/CN2019/108946, filed on Sep. 29, 2019, which claims priority to Chinese Patent Application No. 201910759569.9, filed with the Chinese Patent Office on Aug. 16, 2019 and entitled "CHARGING CASE", both of which are incorporated herein by reference in its entirety.

TECHNICAL FIELD

The present disclosure relates to charging technology, and more particularly to a charging case.

BACKGROUND

With the development of chip technology, TWS (True Wireless Stereo) earphones have increasingly entered the public eye. TWS earphones usually comprise separated a left ear earphone and a right ear earphone which are separated, with no wires arranged therebetween, and thus completely free from wires.

Current TWS earphones on the market are generally charged with a charging case. A principle block diagram of a charging part pathway is shown in FIG. 1: the left side is a part of circuit of the charging case, and the right side is a part of circuit of the earphones. During charging, the charging case and the earphone therebetween adopt a contact type connection (Pogo pin) to achieve charging and communication functions. Particularly, a positive electrode of a charging case battery is connected with an input end of a voltage conversion chip, an output end of the voltage conversion chip is connected with a positive contact T1 of the charging case, and a negative electrode of the charging case battery is connected with a negative contact T2 of the charging case. An input end of a charging management chip is connected with a positive contact T11 on an earphone end, an output end of the charging management chip is connected with a positive electrode of an earphone end battery, and a negative electrode of the earphone end battery is connected with a negative contact T12.

When the earphone is put into the charging case correctly, the positive contact T1 of the charging case is communicated with the positive contact T11 of the earphone, and the negative contact T2 of the charging case is communicated with the negative contact T12 of the earphone. A controller of the charging case detects that the earphone is put in through a detection circuit (not shown in FIG. 1), sends a control signal to an enabling end of the voltage conversion chip to enable the voltage conversion chip to enter a operating state, and thus forms a charging pathway. Direct current provided by the charging case battery is boosted through the voltage conversion chip, and then charges the earphone battery through the charging management chip, during charging of the earphone battery, the charging management chip plays a role of management to adjust magnitude of a charging current mainly depending on a voltage of the earphone battery.

In the prior art, the charging management chip has a relatively low charging efficiency, thereby causing reduction of the overall pathway efficiency when the charging case charges the earphone.

SUMMARY

The present disclosure aims at providing a charging case with higher charging efficiency.

A charging case is provided according to the present disclosure, the charging case comprises a control module, a charging case battery and a voltage conversion module;

the charging case battery is connected with the voltage conversion module; the voltage conversion module is configured for converting a direct current output by the charging case battery into a charging voltage and outputting the charging voltage to a charging management chip of a to-be-charged device so as to charge a battery of the to-be-charged device through the charging management chip; and the control module is configured to regulate the charging voltage output by the voltage conversion module according to a voltage of the battery of the to-be-charged device during charging of the battery of the to-be-charged device.

Alternatively or preferably, regulating the charging voltage output by the voltage conversion module according to the voltage of the battery of the to-be-charged device comprises:

calculating a charging voltage target value; the charging voltage target value being a sum value of a current voltage value of the battery of the to-be-charged device, a current voltage drop value of a charging pathway, and a charging threshold of the charging management chip; wherein the charging pathway is a pathway from an output end of the voltage conversion module to an input end of the charging management chip;

regulating the charging voltage output by the voltage conversion module according to the charging voltage target value.

Alternatively or preferably, regulating the charging voltage output by the voltage conversion module according to the charging voltage target value comprises:

if a voltage of the charging case battery is greater than the charging voltage target value, letting the charging voltage output by the voltage conversion module be the voltage of the charging case battery, or letting the voltage conversion module perform voltage dropping to make the charging voltage be equal to the charging voltage target value;

if the voltage of the charging case battery is equal to the charging voltage target value, letting the charging voltage output by the voltage conversion module be the voltage of the charging case battery;

if the voltage of the charging case battery is less than the charging voltage target value, letting the voltage conversion module perform boosting to make the charging voltage be equal to the charging voltage target value.

Alternatively or preferably, the charging case comprises a memory; the memory stores therein a correspondence between the voltage drop value of the charging pathway and the voltage value of the battery of the to-be-charged device:

calculating a charging voltage target value comprises: searching a voltage drop value of the charging pathway corresponding to the current voltage value of the battery of the to-be-charged device to serve as the current voltage drop value of the charging pathway.

Alternatively or preferably, the voltage conversion module comprises a voltage conversion chip, a first resistor, a second resistor, a controlled switch, and a positive contact and a negative contact configured for connection with the to-be-charged device;

the voltage conversion chip and the controlled switch are in parallel connection, and are respectively connected between a positive electrode of the charging case battery and the positive contact; an input end of the voltage conversion chip is connected with the positive electrode of the charging case battery, and an output end of the voltage conversion chip is connected with the positive contact;

the output end of the voltage conversion chip is connected with one end of the first resistor, the other end of the first resistor is connected with a first end of the second resistor, and a second end of the second resistor is grounded; a voltage feedback end of the voltage conversion chip is connected with the first end of the second resistor;

the control module is connected with an enabling end of the voltage conversion chip, a control end of the controlled switch, and a resistance regulating end of the second resistor respectively;

a negative electrode of the charging case battery is connected with the negative contact.

Alternatively or preferably, the control module is configured such that:

if a voltage of the charging case battery is greater than or equal to a charging voltage target value, the control module controls the voltage conversion chip to stop operation and controls the controlled switch to be switched on;

if the voltage of the charging case battery is less than the charging voltage target value, the control module controls the controlled switch to be switched off, and the control module controls the voltage conversion chip to boost and regulates the resistance of the second resistor, so as to let the charging voltage be equal to the charging voltage target value.

Alternatively or preferably, the second resistor is a digital resistor or a digital potentiometer.

Alternatively or preferably, the voltage conversion module comprises a voltage conversion chip, a third resistor, a fourth resistor, a resistor-capacitor network, a controlled switch, and a positive contact and a negative contact configured for connection with the to-be-charged device;

the voltage conversion chip and the controlled switch are in parallel connection, and are respectively connected between a positive electrode of the charging case battery and the positive contact; an input end of the voltage conversion chip is connected with the positive electrode of the charging case battery, and an output end of the voltage conversion chip is connected with the positive contact;

the output end of the voltage conversion chip is connected with one end of the third resistor, the other end of the third resistor is connected with a first end of the fourth resistor, and a second end of the fourth resistor is grounded; a voltage feedback end of the voltage conversion chip is connected with the first end of the fourth resistor;

the resistor-capacitor network is connected between a pulse signal output end of the control module and the first end of the fourth resistor;

the control module is connected with an enabling end of the voltage conversion chip, and a control end of the controlled switch respectively;

a negative electrode of the charging case battery is connected with the negative contact.

Alternatively or preferably, the control module is configured such that:

if a voltage of the charging case battery is greater than or equal to a charging voltage target value, the control module controls the voltage conversion chip to stop operation and controls the controlled switch to be switched on;

if the voltage of the charging case battery is less than the charging voltage target value, the control module controls the controlled switch to be switched off, and the control module controls the voltage conversion chip to boost and regulates a duty ratio of a pulse signal output by the control module, so as to let the charging voltage be equal to the charging voltage target value.

Alternatively or preferably, the resistor-capacitor network comprises a fifth resistor, a sixth resistor, and a first capacitor;

the fifth resistor and the sixth resistor are connected in series between the pulse signal output end of the control module and the first end of the fourth resistor;

one end of the first capacitor is connected between the fifth resistor and the sixth resistor, and the other end of the first capacitor is grounded.

Alternatively or preferably, the voltage conversion module comprises a voltage conversion chip, a seventh resistor, an eighth resistor, a ninth resistor, a controlled switch, a digital-to-analog conversion unit, and a positive contact and a negative contact configured for connection with the to-be-charged device;

the voltage conversion chip and the controlled switch are in parallel connection, and are respectively connected between a positive electrode of the charging case battery and the positive contact; an input end of the voltage conversion chip is connected with the positive electrode of the charging case battery, and an output end of the voltage conversion chip is connected with the positive contact;

the output end of the voltage conversion chip is connected with one end of the seventh resistor, the other end of the seventh resistor is connected with a first end of the eighth resistor, and a second end of the eighth resistor is grounded; a voltage feedback end of the voltage conversion chip is connected with the first end of the eighth resistor;

a digital regulating signal output end of the control module is connected with an input end of the digital-to-analog conversion unit, an output end of the digital-to-analog conversion unit is connected with one end of the ninth resistor, and the other end of the ninth resistor is connected with the first end of the eighth resistor;

the control module is connected with an enabling end of the voltage conversion chip, and a control end of the controlled switch respectively.

a negative electrode of the charging case battery is connected with the negative contact.

Alternatively or preferably, the control module is configured such that:

if a voltage of the charging case battery is greater than or equal to a charging voltage target value, the control module controls the voltage conversion chip to stop operation and controls the controlled switch to be switched on;

if the voltage of the charging case battery is less than the charging voltage target value, the control module controls the controlled switch to be switched off, and the control module controls the voltage conversion chip to boost and regulates magnitude of a voltage output by the digital-to-analog conversion unit, so as to let the charging voltage be equal to the charging voltage target value.

Alternatively or preferably, the voltage conversion module comprises a voltage conversion chip, a tenth resistor, an eleventh resistor, a twelfth resistor, a digital-to-analog conversion unit, and a positive contact and a negative contact configured for connection with the to-be-charged device;

an input end of the voltage conversion chip is connected with a positive electrode of the charging case battery, and an output end of the voltage conversion chip is connected with the positive contact;

the output end of the voltage conversion chip is connected with one end of the tenth resistor, the other end of the tenth resistor is connected with a first end of the eleventh resistor, and a second end of the eleventh resistor is grounded; a voltage feedback end of the voltage conversion chip is connected with the first end of the eleventh resistor;

a digital regulating signal output end of the control module is connected with an input end of the digital-to-analog conversion unit, an output end of the digital-to-analog conversion unit is connected with one end of the twelfth resistor, and the other end of the twelfth resistor is connected with the first end of the eleventh resistor;

the control module is connected with an enabling end of the voltage conversion chip;

a negative electrode of the charging case battery is connected with the negative contact.

Alternatively or preferably, the control module controls the voltage conversion chip to operate and outputs a digital adjusting signal to let a charging voltage output by the voltage conversion chip be the charging voltage target value.

A charging case provided by embodiments of the present disclosure may regulate a charging voltage output by the charging case in real time during charging, thereby improving the charging efficiency.

Other features and advantages of the present disclosure will become clear from the following detailed description of exemplary embodiments of the present disclosure with reference to accompanying drawings.

BRIEF DESCRIPTION OF THE DRAWINGS

To illustrate the technical solutions of the embodiments of the present disclosure more clearly, drawings required to be used in the embodiments will be briefly introduced below. It should be understood that the following drawings illustrate only certain embodiments of the present disclosure and are therefore not to be considered as limiting of scope. For a person of ordinary skill in the art, other relevant drawings may be obtained according to the drawings without any creative effort.

DETAILED DESCRIPTION OF THE EMBODIMENTS

Figure 1:
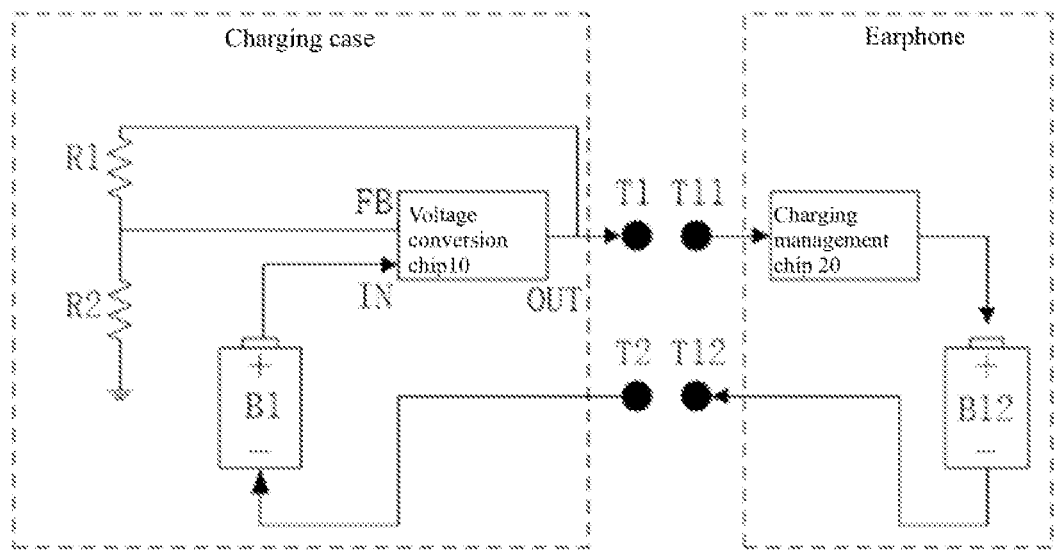
FIG. 1 shows a circuit diagram of a charging case and an earphone in the prior art.

Various exemplary embodiments of the present disclosure will now be described in detail with reference to the accompanying drawings. It should be noted that the relative arrangement, numerical expressions and numerical values of the components and steps set forth in these examples do not limit the scope of the disclosure unless otherwise specified.

The following description of at least one exemplary embodiment is in fact merely illustrative and is in no way intended as a limitation to the present disclosure and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

Embodiments of the present disclosure relate to an electronic device and a charging case for charging the electronic device. The electronic device may be a TWS earphone. The electronic device may also be other types of electronic devices, such as a smart watch, a bracelet, a mobile phone, and the like, which is not limited by the present disclosure. The charging case provided by the embodiments of the present disclosure is illustrated in the following by taking an electronic device, such as a TWS earphone, as an example.

As shown in FIG. 1, in a charging process, a voltage at an input end of a charging management chip 20 is greater than that of an output end, and the charging management chip 20 may charge an earphone battery B12 when a certain voltage difference is reached. This voltage difference is referred to as a charging threshold of the charging management chip 20.

In the prior art, a voltage conversion chip 10 at a charging case end boosts a 15 direct current output by a charging case battery B1 and outputs the boosted direct current to the charging management chip 20 at an earphone end, so as to ensure that the voltage difference between the voltage at the input end and the voltage at the output end of the charging management chip 20 reaches a charging threshold or above and thereby charge the earphone battery B12 through the charging management chip 20.

The voltage conversion chip 10 is externally connected with a resistor divider network. Particularly, an output end OUT of the voltage conversion chip 10 (also called as a DCDC chip, a direct current power supply voltage conversion chip in the field) is connected with one end of a resistor R1, the other end of the resistor R1 is connected with the first end of a resistor R2, and the first end of the resistor R2 is grounded. A voltage feedback end FB of the voltage conversion chip 10 is connected with the first end of the second resistor R2.

A voltage output by the output end OUT of the voltage conversion chip 10 is denoted by VOUT, a voltage at a voltage feedback end FB of the voltage conversion chip 10 is donated by VFB, a reference voltage of the voltage conversion chip 10 is donated by VREF, and the reference voltage of the voltage conversion chip 10 is related to a specific model of the voltage conversion chip 10 and is a parameter of the voltage conversion chip 100 itself.

Through voltage division of the resistor divider network and feedback of the voltage feedback end, the voltage VOUT output by the output end of the voltage conversion chip 10 is stabilized at VREF×(R1+R2)/R2. In one specific example, the voltage conversion chip 10 is internally provided with a comparator and a switching tube, and the comparator compares the voltage VFB at the voltage feedback end FB with the reference voltage VREF and regulates on-off of the switching tube according to a comparison result, so as to stabilize the VOUT at VREF×(R1+R2)/R2. A person skilled in the art may set a specific resistor divider network according to a voltage value expected to be output by the voltage conversion chip 10.

However, the larger the voltage difference between two ends of the charging management chip 20 is, the lower the charging efficiency is. Especially in a early charging period, the earphone battery B12 has a particularly low voltage, that is, the charging management chip 20 has a particularly low voltage at the output end, and thus has a particularly large voltage difference between the two ends thereof, resulting in particularly low charging efficiency and affecting user experience.

A solution provided by the present application is that: during charging, dynamically regulating a voltage value output by the charging case to the charging management chip 20, that is, dynamically regulating a voltage value output by the output end of the voltage conversion module of the charging case, and maintaining the voltage difference between the two ends of the charging management chip 20 at the earphone end in a relatively proper condition, thus improving the charging efficiency.

In one specific example, a charging test is carried out in advance, and a voltage value of the earphone battery B12 and a voltage drop value of a charging pathway during charging are detected, and are recorded in a corresponding mode. The charging pathway is a pathway from the output end of the voltage conversion module to an input end of the charging management chip 20. It can be known that the voltage at the input end of the charging management chip 20=the voltage output by the output end of the voltage conversion module–the voltage drop of the charging pathway. The voltage at the output end of the charging management chip is basically equal to the voltage of the earphone battery. Voltage drop between the two ends of the charging management chip=a voltage output by the output end of the voltage conversion module–the voltage drop of the charging pathway–the voltage of the earphone battery. During charging, the voltage drop between the two ends of the charging management chip is ensured to be equal to or slightly greater than the charging threshold, thereby ensuring relatively high charging efficiency while achieving charging.

The person skilled in the art has various ways of detecting the voltage value of the earphone battery and the voltage drop value of the charging pathway during charging. For example, detecting the voltage of the earphone battery and a current I1 between the output end of the charging management chip and the earphone battery B12; according to the current I1 and the specific charging management chip, the person skilled in the art may determine a current I between the output end of the voltage conversion module and the input end of the charging management chip; and then according to an internal resistance R of the charging pathway, the voltage drop value of the charging pathway may be obtained, the voltage drop value of the charging pathway=R×I. Certainly, voltage drop values of corresponding charging pathways when the earphone is in various voltage charging stages such as trickle current, constant current and constant voltage may also be directly tested. The voltage of the earphone battery and the voltage drop value of the charging pathway at the same moment are stored in an associated manner and saved in a memory of the charging case.

The charging case may perform dynamic charging management by utilizing the stored associated data. Further description will now be made with reference to FIGS. 2-6.

First Embodiment

Figure 2:
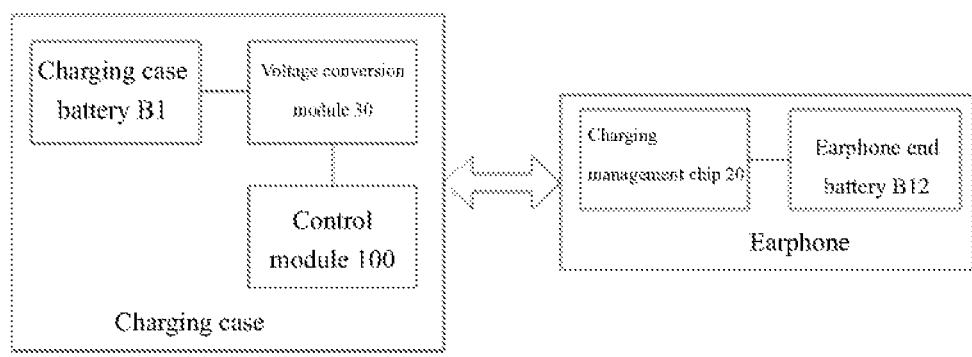
FIG. 2 shows a circuit diagram of a charging case and an earphone provided by a first embodiment of the present disclosure.

As shown in FIG. 2, the first embodiment of the present disclosure provides a charging case and it comprises a control module 100, a charging case battery B1, and a voltage conversion module 30.

The charging case battery B1 is connected with the voltage conversion module 30. The voltage conversion module 30 is configured for converting a direct current output by the charging case battery B1 into a charging voltage and outputting the charging voltage to a charging management chip 20 of a to-be-charged device, thereby charging a battery B12 of the to-be-charged device through the charging management chip 20.

The control module 100 is configured to regulate the charging voltage output by the voltage conversion module 30 according to a voltage of the battery B12 of the to-be-charged device during charging of the battery B12 of the to-be-charged device. Particularly, the control module 100 calculates a charging voltage target value, and regulates the charging voltage output by the voltage conversion module 30 according to the charging voltage target value. The control module 100 may be implemented by adopting a processor, for example, a central processing unit CPU or a micro-controller unit, and the like.

The charging voltage target value is a sum value of a current voltage value of the battery B12 of the to-be-charged device, a current voltage drop value of a charging pathway, and a charging threshold of the charging management chip 20. The charging pathway is a pathway from an output end of the voltage conversion module 30 to an input end of the charging management chip 20. Since a voltage of the earphone battery B12 and a voltage drop value of the charging pathway at the same moment are stored in a memory of the charging case in an associated manner, the voltage drop value of the charging pathway corresponding to the current voltage value of the battery B12 of the to-be-charged device may be acquired by a searching way, and the searched voltage drop value is used as the current voltage drop value of the charging pathway.

If a voltage of the charging case battery B1 is greater than the charging voltage target value, the charging voltage output by the voltage conversion module 30 is the voltage of the charging case battery B1, or the voltage conversion module 30 performs the voltage dropping to make the charging voltage be equal to the charging voltage target value. That is, in one specific example, if the voltage of the charging case battery B1 is greater than the charging voltage target value, the voltage conversion module 30 may directly provide the voltage of the charging case battery B1 to the earphone end, without performing a boosting operation. Or, in another specific example, if the voltage of the charging case battery B1 is greater than the charging voltage target value, the voltage conversion module 30 may perform a voltage drop operation to reduce the voltage output by the charging case battery B1 to the charging voltage target value and then provide the target value to the earphone end.

If the voltage of the charging case battery B1 is equal to the charging voltage target value, the charging voltage output by the voltage conversion module 30 is the voltage of the charging case battery.

If the voltage of the charging case battery B1 is less than the charging voltage target value, the voltage conversion module 30 performs a boosting to make the charging voltage be equal to the charging voltage target value. The voltage conversion module 30 may directly provide the voltage of the charging case battery B1 to the earphone end.

By means of the above way, by dynamically regulating a voltage output by the charging case to the charging management chip during charging, it may be ensured that a voltage difference between two ends of the charging management chip reaches a charging threshold and is not too large, which improves charging efficiency of a charging protection chip and thus improves the overall charging efficiency.

Second Embodiment

Figure 3:
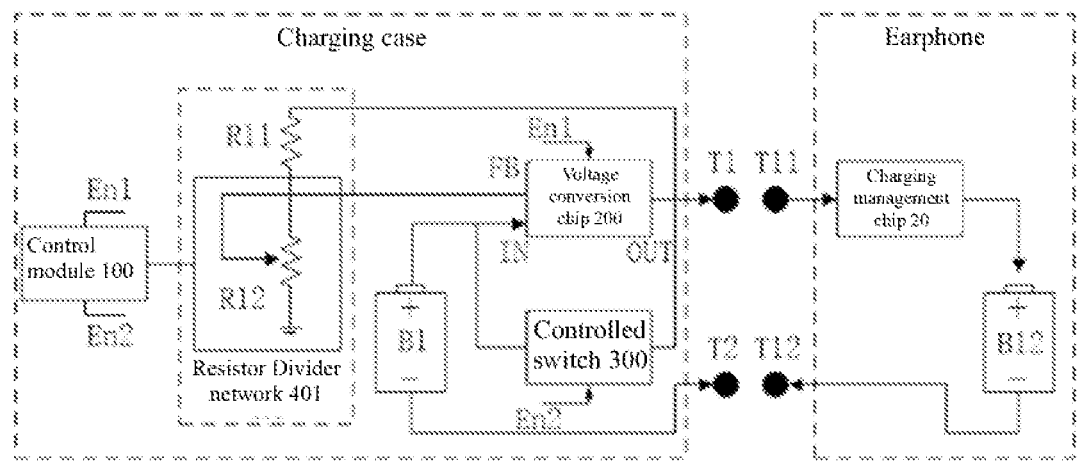
FIG. 3 shows a circuit diagram of a charging case and an earphone provided by a second embodiment of the present disclosure.

As shown in FIG. 3, a charging case provided by the second embodiment of the present disclosure is illustrated.

The voltage conversion module comprises a voltage conversion chip 200, a controlled switch 300, and a positive contact T1 and a negative contact T2 that are configured for connection with a to-be-charged device.

The voltage conversion chip 200 and the controlled switch 300 are in parallel connection, the parallel voltage conversion chip 200 and the controlled switch 300 are positioned between a positive electrode of the charging case battery B1 and the positive contact T1 and connected in series with them; and an input end IN of the voltage conversion chip 200 is connected with the positive electrode of the charging case battery B1, and an output end OUT of the voltage conversion chip 200 is connected with the positive contact T1.

A control module 100 is connected with an enabling end of the voltage conversion chip 200 and a control end of the controlled switch 300 respectively. The control module 100 is configured to output an enabling signal EN1 to the enabling end of the voltage conversion chip 200 to control the voltage conversion chip 200 to start operation, and is configured to output a control signal EN2 to the control end of the controlled switch 300 to control the controlled switch 300 to be switched on.

A negative electrode of the charging case battery B1 is connected with the negative contact T2.

The voltage conversion module further comprises a resistor divider network 401, and the voltage conversion chip 200 is externally connected with the resistor divider network 401. The resistor divider network 401 comprises a first resistor R11 and a second resistor R12. The output end OUT of the voltage conversion chip 200 is connected with one end of the first resistor R11, the other end of the first resistor R11 is connected with a first end of the second resistor R12, and a second end of the second resistor R12 is grounded; and a voltage feedback end FB of the voltage conversion chip 200 is connected with the first end of the second resistor R12.

The second resistor R12 is an adjustable resistor, a digital signal output end of the control module 100 is connected with a resistance regulating end of the second resistor R12, and the control module 100 outputs an I2C communication signal or a SPI communication signal to the second resistor R12. The control module 100 is configured to regulate a resistance of the second resistor R12. In one more specific example, the second resistor R12 is a digital resistor or a digital potentiometer.

If a voltage of the charging case battery B1 is greater than or equal to a charging voltage target value, the control module 100 controls the voltage conversion chip 200 to stop operation and controls the controlled switch 300 to be switched on, and a charging voltage output by the voltage conversion module to the earphone end through the controlled switch 300 is the voltage of the charging case battery.

If the voltage of the charging case battery B1 is less than the charging voltage target value, the control module 100 controls the voltage conversion chip 200 to operate and controls the controlled switch 300 to be switched off. The control module 100 regulates the resistance of the second resistor R12 according to the charging voltage target value so as to adjust an amplification coefficient of a reference voltage input to the voltage conversion chip 200, wherein the amplification coefficient of the reference voltage is (R11+R12)/R12. The voltage conversion chip 200 performs a boosting operation according to a preset reference voltage and the amplification coefficient of the reference voltage to make the charging voltage be equal to the charging voltage target value.

By means of the above way, by dynamically regulating a voltage output by the charging case to the charging management chip during charging, it may be ensured that a voltage difference between two ends of the charging management chip reaches a charging threshold and is not too large, which improves charging efficiency of a charging protection chip, and thus improves a overall charging efficiency.

Third Embodiment

Figure 4:
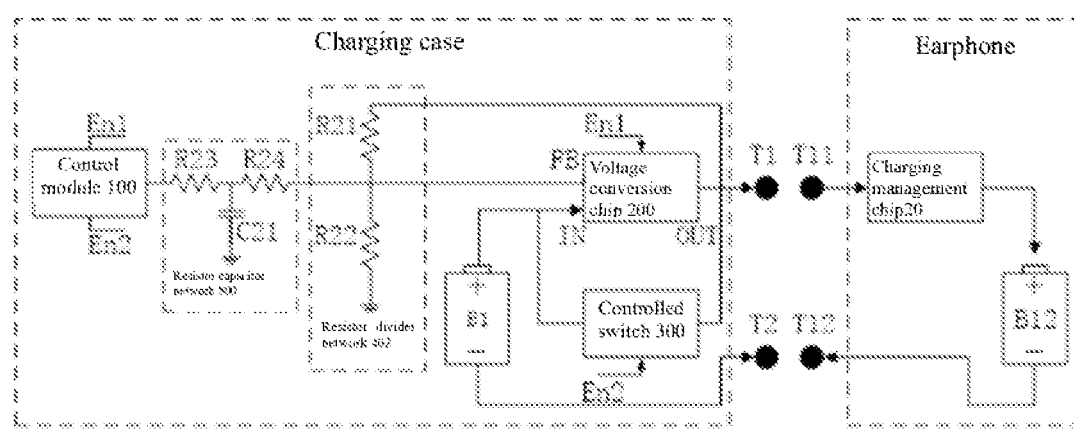
FIG. 4 shows a circuit diagram of a charging case and an earphone provided by a third embodiment of the present disclosure.

As shown in FIG. 4, a charging case provided by the third embodiment is illustrated.

The voltage conversion module comprises a voltage conversion chip 200, a controlled switch 300, and a positive contact T1 and a negative contact T2 that are configured for connection with a to-be-charged device.

The voltage conversion chip 200 and the controlled switch 300 are in parallel connection, and the parallel voltage conversion chip 200 and the controlled switch 300 are positioned between a positive electrode of the charging case battery B1 and the positive contact T1 and connected in series with them. An input end IN of the voltage conversion chip 200 is connected with the positive electrode of the charging case battery B1, and an output end OUT of the voltage conversion chip 200 is connected with the positive contact T1.

A control module 100 is connected with an enabling end of the voltage conversion chip 200 and a control end of the controlled switch 300 respectively. The control module 100 is configured to output an enabling signal EN1 to the enabling end of the voltage conversion chip 200 to control the voltage conversion chip 200 to start operation, and is configured to output a control signal EN2 to the control end of the controlled switch 300 to control the controlled switch 300 to be switched on.

A negative electrode of the charging case battery B1 is connected with the negative contact T2.

The voltage conversion module further comprises a resistor divider network 402, and the voltage conversion chip 200 is externally connected with the resistor divider network 402. The resistor divider network 402 comprises a third resistor R21 and a fourth resistor R22. The output end OUT of the voltage conversion chip 200 is connected with one end of the third resistor R21, the other end of the third resistor R21 is connected with a first end of the fourth resistor R22, and a second end of the fourth resistor R22 is grounded; and a voltage feedback end FB of the voltage conversion chip 200 is connected with the first end of the fourth resistor R22.

The voltage conversion module further comprises a resistor-capacitor network 500. The resistor-capacitor 500 is connected between a pulse signal output end of the control module 100 and the first end of the fourth resistor R22. In one specific example, the resistor-capacitor 500 comprises a fifth resistor R23, a sixth resistor R24, and a first capacitor C21. The fifth resistor R23 and the sixth resistor R24 are connected in series between the pulse signal output end of the control module 100 and the first end of the fourth resistor R22; and one end of the first capacitor C21 is connected between the fifth resistor R23 and the sixth resistor R24, and the other end of the first capacitor C21 is grounded. The resistor-capacitor 500 may also employ the resistor-capacitor network 500 of other types or other circuit configurations, which will not be described herein.

If a voltage of the charging case battery B1 is greater than or equal to a charging voltage target value, the control module 100 controls the voltage conversion chip 200 to stop operation and controls the controlled switch 300 to be switched on, and a charging voltage output by the voltage conversion module to the earphone end through the controlled switch 300 is the voltage of the charging case battery.

If the voltage of the charging case battery B1 is less than the charging voltage target value, the control module 100 controls the voltage conversion chip 200 to operate and controls the controlled switch 300 to be switched off. The control module 100 outputs a PWM (Pulse Width Modulation) pulse signal to the resistor-capacitor 500, and the resistor-capacitor 500 converts the PWM pulse signal into a voltage signal and transmits the voltage signal to the resistor divider network 402. The control module 100 regulates a duty ratio of the output PWM pulse signal according to the charging voltage target value to regulate the magnitude of a voltage after converting the PWM pulse signal, thereby adjusting a current to the resistor divider network 402 from the output end OUT of the voltage conversion chip 200 and regulating a voltage value at the feedback end FB. Therefore, the voltage conversion chip 200 makes a charging voltage output by the voltage conversion chip 200 be equal to the charging voltage target value according to a reference voltage, a reference voltage amplification coefficient, the voltage after converting the PWM pulse signal and values of R23 and R21. Wherein the reference voltage amplification coefficient is (R21+R22)/R22.

By means of the above way, by dynamically regulating a voltage output by the charging case to the charging management chip during charging, it may be ensured that a voltage difference between two ends of the charging management chip reaches a charging threshold and is not too large, which improves charging efficiency of a charging protection chip and thus improves a overall charging efficiency.

Fourth Embodiment

Figure 5:
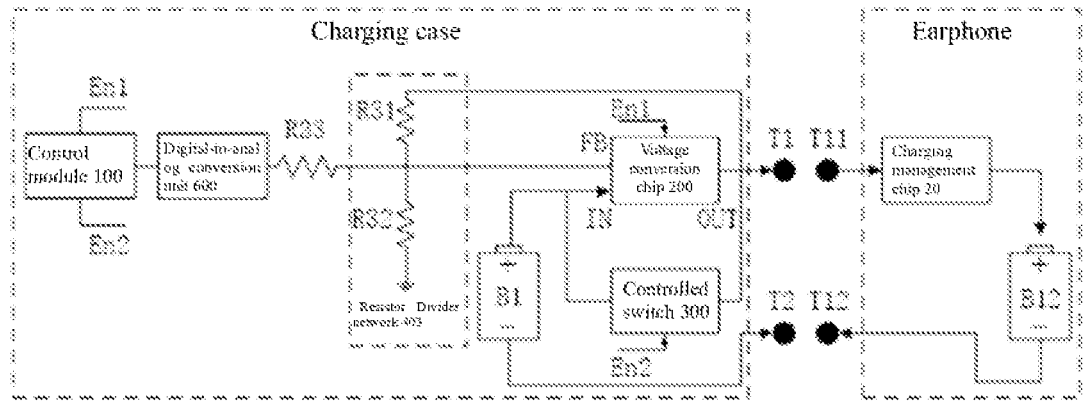
FIG. 5 shows a circuit diagram of a charging case and an earphone provided by a fourth embodiment of the present disclosure.

As shown in FIG. 5, a charging case provided by the fourth embodiment of the present disclosure is illustrated.

The voltage conversion module comprises a voltage conversion chip 200, a controlled switch 300, and a positive contact T1 and a negative contact T2 that are configured for connection with a to-be-charged device.

The voltage conversion chip 200 and the controlled switch 300 are positioned between a positive electrode of the charging case battery B1 and the positive contact T1 and are connected in parallel with them. An input end IN of the voltage conversion chip 200 is connected with the positive electrode of the charging case battery B1, and an output end OUT of the voltage conversion chip 200 is connected with the positive contact T1.

A control module 100 is connected with an enabling end of the voltage conversion chip 200 and a control end of the controlled switch 300 respectively.

The control module 100 is configured to output an enabling signal EN1 to the enabling end of the voltage conversion chip 200 to control the voltage conversion chip 200 to start operation, and is configured to output a control signal EN2 to the control end of the controlled switch 300 to control the controlled switch 300 to be switched on.

A negative electrode of the charging case battery B1 is connected with the negative contact T2.

The voltage conversion module further comprises a resistor divider network 403, and the voltage conversion chip 200 is externally connected with the resistor divider network 403. The resistor divider network 403 comprises a seventh resistor R31 and an eighth resistor R32. The output end of the voltage conversion chip 200 is connected with one end of the seventh resistor R31, the other end of the seventh resistor R31 is connected with a first end of the eighth resistor R32, and a second end of the eighth resistor R32 is grounded; and a voltage feedback end FB of the voltage conversion chip 200 is connected with the first end of the eighth resistor R32.

The voltage conversion module further comprises a ninth resistor R33 and a digital-to-analog conversion unit 600. A digital regulating signal output end of the control module 100 is connected with an input end of the digital-to-analog conversion unit 600, an output end of the digital-to-analog conversion unit 600 is connected with one end of the ninth resistor R33, and the other end of the ninth resistor R33 is connected with the first end of the eighth resistor R32. The control module 100 outputs a digital regulating signal to the digital-to-analog conversion unit 600, for example, an I2C communication signal or a SPI communication signal.

If a voltage of the charging case battery B1 is greater than or equal to a charging voltage target value, the control module 100 controls the voltage conversion chip 200 to stop operation and controls the controlled switch 300 to be switched on, and a charging voltage output by the voltage conversion module to the earphone end through the controlled switch 300 is the voltage of the charging case battery.

If the voltage of the charging case battery B1 is less than the charging voltage target value, the control module 100 controls the voltage conversion chip 200 to operate and controls the controlled switch 300 to be switched off. The control module 100 outputs the digital regulating signal to the digital-to-analog conversion unit 600, and the digital-to-analog conversion unit 600 converts the digital regulating signal into an analog voltage signal and transmits the analog voltage signal to the resistor divider network 403 through the ninth resistor R33. The control module 100 regulates the output digital regulating signal according to the charging voltage target value to control the magnitude of a voltage value transmitted by the digital-to-analog conversion unit 600 to the resistor divider network 403, thereby regulating a current passing through the ninth resistor R33, that is, regulating a current from the output end OUT of the voltage conversion chip 200 to the resistor divider network 403, and regulating a voltage value at the feedback end FB. Therefore, the voltage conversion chip 200 makes the charging voltage output by the voltage conversion chip 200 be equal to the charging voltage target value according to a reference voltage, a reference voltage amplification coefficient, the voltage value converted and output by the digital-to-analog conversion unit 600, and values of R33 and R31. Wherein the reference voltage amplification coefficient is (R31+R32)/R32.

By means of the above way, by dynamically regulating a voltage output by the charging case to the charging management chip during charging, it may be ensured that a voltage difference between two ends of the charging management chip reaches a charging threshold and is not too large, which improves charging efficiency of a charging protection chip and thus improves a overall charging efficiency.

Fifth Embodiment

Figure 6:
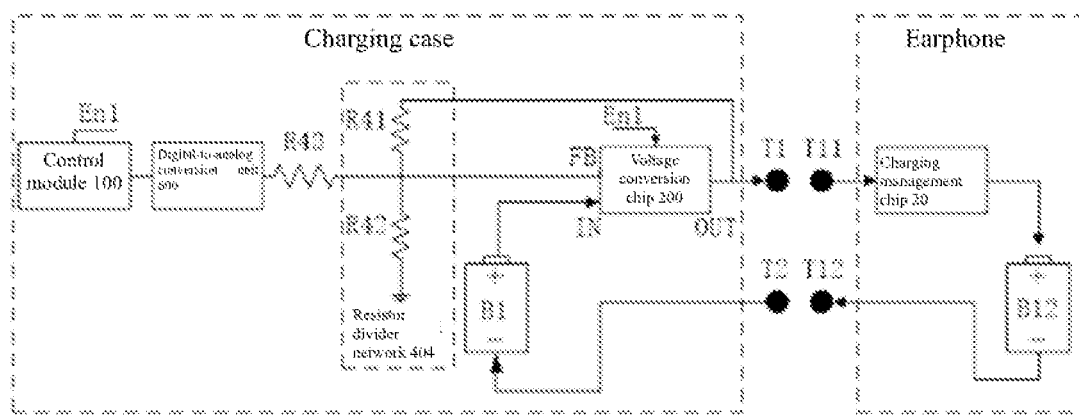
FIG. 6 shows a circuit diagram of a charging case and an earphone provided by a fifth embodiment of the present disclosure.

As shown in FIG. 6, a charging case provided by the fifth embodiment of the present disclosure is illustrated.

The voltage conversion module comprises a voltage conversion chip 200, a resistor divider network 404, a twelfth resistor R43, a digital-to-analog conversion unit 600, and a positive contact T1 and a negative contact T2 that are configured for connection with the to-be-charged device. The resistor divider network 404 comprises a tenth resistor R41 and an eleventh resistor R42.

An input end IN of the voltage conversion chip 200 is connected with a positive electrode of the charging case battery, and an output end OUT of the voltage conversion chip 200 is connected with the positive contact T1.

In one example, a controlled switch is integrated between the input end IN and the output end OUT of the voltage conversion chip 200.

The output end OUT of the voltage conversion chip 200 is connected with one end of the tenth resistor R41, the other end of the tenth resistor R41 is connected with a first end of the eleventh resistor R42, and a second end of the eleventh resistor R42 is grounded; and a voltage feedback end FB of the voltage conversion chip 200 is connected with the first end of the eleventh resistor R42.

A digital regulating signal output end of a control module 100 is connected with an input end of the digital-to-analog conversion unit 600, an output end of the digital-to-analog conversion unit 600 is connected with one end of the twelfth resistor R43, and the other end of the twelfth resistor R43 is connected with the first end of the eleventh resistor R42. The control module 100 outputs a digital regulating signal to the digital-to-analog conversion unit 600, for example, an I2C communication signal or a SPI communication signal.

A negative electrode of the charging case battery is connected with the negative contact T2.

If a voltage of the charging case battery B1 is equal to a charging voltage target value, the control module 100 controls the controlled switch integrated in the voltage conversion chip 200 to be switched on, and the charging voltage output by the voltage conversion module to the earphone end through the controlled switch is the voltage of the charging case battery.

If the voltage of the charging case battery B1 is less than the charging voltage target value, the control module 100 controls the controlled switch integrated in the voltage conversion chip 200 to be switched on, and outputs a digital regulating signal to the digital-to-analog conversion unit 600, and the digital-to-analog conversion unit 600 converts the digital regulating signal into an analog voltage signal and transmits the analog voltage signal to the resistor divider network 404 through the twelfth resistor R43. The control module 100 regulates the output digital regulating signal according to the charging voltage target value to control the magnitude of a voltage value transmitted by the digital-to-analog conversion unit 600 to the resistor divider network 404, thereby regulating a current passing through the ninth resistor R43, that is, adjusting a current from the output end OUT of the voltage conversion chip 200 to the resistor divider network 404, and regulating the voltage value at the feedback end FB. Therefore, the voltage conversion chip 200 makes the charging voltage output by the voltage conversion chip 200 be equal to the charging voltage target value according to a reference voltage, a reference voltage amplification coefficient, the voltage value converted and output by the digital-to-analog conversion unit 600, and values of R43 and R41. Wherein the reference voltage amplification coefficient is (R41+R42)/R42.

If the voltage of the charging case battery B1 is greater than the charging voltage target value, the control module 100 controls the controlled switch integrated in the voltage conversion chip 200 to be switched off, and outputs a digital regulating signal to the digital-to-analog conversion unit 600, and the digital-to-analog conversion unit 600 converts the digital regulating signal into an analog voltage signal and transmits the analog voltage signal to the resistor divider network 404 through the twelfth resistor R43. The control module 100 regulates the output digital regulating signal according to the charging voltage target value to control the magnitude of a voltage value transmitted by the digital-to-analog conversion unit 600 to the resistor divider network 404, thereby regulating a current passing through the ninth resistor R43, that is, adjusting a current from the output end OUT of the voltage conversion chip 200 to the resistor divider network 404, and regulating the voltage value at the feedback end FB. Therefore, the voltage conversion chip 200 makes the charging voltage output by the voltage conversion chip 200 be equal to the charging voltage target value according to the reference voltage, the reference voltage amplification coefficient, the voltage value converted and output by the digital-to-analog conversion unit 600, and the values of R43 and R41. Wherein the reference voltage amplification coefficient is (R41+R42)/R42.

By means of the above way, by dynamically regulating a voltage output by the charging case to the charging management chip during charging, it may be ensured that a voltage difference between two ends of the charging management chip reaches a charging threshold and is not too large, which improves charging efficiency of a charging protection chip and thus improves an overall charging efficiency.

Sixth Embodiment

Figure 7:
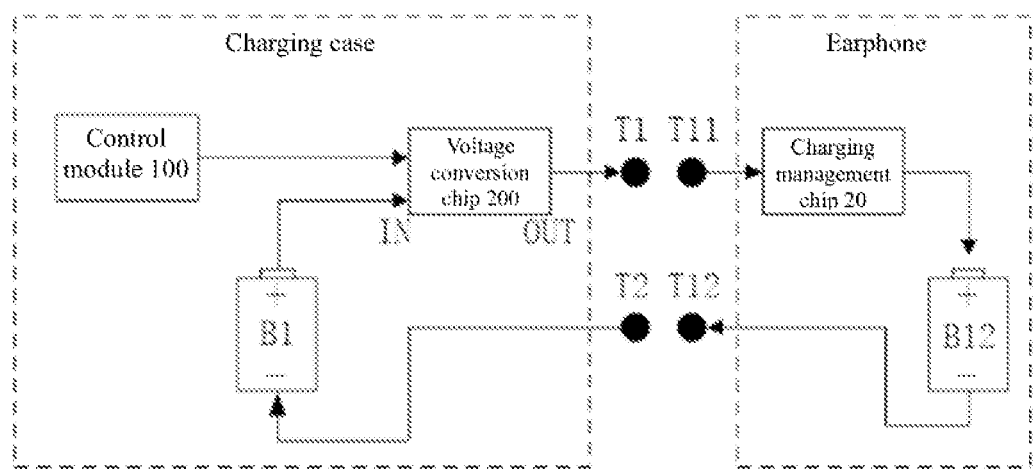
FIG. 7 shows a circuit diagram of a charging case and an earphone provided by a sixth embodiment of the present disclosure.

As shown in FIG. 7, a charging case provided by the sixth embodiment of the present disclosure is illustrated.

The voltage conversion module comprises a voltage conversion chip 200, and a positive contact T1 and a negative contact T2 that are configured for connection with the to-be-charged device.

An input end IN of the voltage conversion chip 200 is connected with a control module 100 and a positive electrode of the charging case battery respectively, and an output end OUT of the voltage conversion chip is connected with the positive contact T.

The voltage conversion chip 200 comprises an I2C control interface or a SPI control interface. The voltage conversion chip 200 may be directly connected with the control module 100.

The control module 100 controls the voltage conversion chip 200 to operate and makes a charging voltage output by the voltage conversion chip 200 be equal to a charging voltage target value by outputting a digital regulating signal.

Seventh Embodiment

An embodiment of the present disclosure further provides a charging case, which comprises a charging case battery, a voltage conversion module, a processor, and a memory.

The charging case battery is connected with the voltage conversion module; the voltage conversion module is configured for converting a direct current output by the charging case battery into a charging voltage and outputting the charging voltage to a charging management chip of a to-be-charged device, thereby charging a battery of the to-be-charged device through the charging management chip.

The voltage conversion module may integrate any one of voltage conversion modules in the embodiments described above.

The memory is configured for storing executable instructions.

It can dynamically regulate the charging voltage output by the voltage conversion module according to a voltage of the battery of the to-be-charged device when instructions are operated by the processor.

A specific dynamic regulation process is described in the foregoing embodiments and will not be described repeatedly herein.

Eighth Embodiment

An embodiment of the present disclosure further provides an earphone product, which comprises a TWS earphone and a charging case for charging the TWS earphone.

The charging case comprises any one of the charging cases in the embodiments described above.

Various embodiments in the present specification are described in a progressive manner, the same and similar parts among the various embodiments are referred to each other, each embodiment focuses on differences from the other embodiments, and for related parts, please refer to the description of other embodiments.

The control module, the control conversion module, the voltage conversion chip, and the chip management chip mentioned in the embodiments of the present disclosure may comprise hardware circuits and software programs. According to the control module, the control conversion module, the voltage conversion chip, the chip management chip and various control functions mentioned in the embodiments of the present disclosure may be implemented by instructions in relevant circuits, and how the instructions implement particular functions is well known in the art and will not be discussed too much herein.

The charging case, the control module, the voltage conversion module, the voltage conversion chip, and the charging management chip mentioned in the embodiments of the present disclosure may comprise a computer readable storage medium with computer programs stored thereon. Implementing corresponding functions when the computer program is executed and how instructions implement particular functions are well known in the art and will not be discussed too much herein. The computer readable storage medium can be a tangible device that can retain and store instructions for use by an instruction execution device. The computer readable storage medium may be, for example, but is not limited to, a random access memory (RAM), a read-only memory (ROM), an erasable programmable read-only memory (EPROM or flash memory), and a static random access memory (SRAM).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The scope of the present invention is defined by the attached claims.

The invention claimed is:

1. A charging case for charging a to-be-charged device having a battery and a charging management chip, comprising a control module, a charging case battery and a voltage conversion module; wherein the charging case battery is connected with the voltage conversion module; the voltage conversion module is configured for converting a direct current output by the charging case battery into a charging voltage and outputting the charging voltage to the charging management chip of the to-be-charged device so as to charge the battery of the to-be-charged device through the charging management chip;

the control module is configured to regulate the charging voltage output by the voltage conversion module according to a voltage of the battery of the to-be-charged device during charging thereof by;

calculating a charging voltage target value, the charging voltage target value being a sum value of a current voltage value of the battery of the to-be-charged device, a current voltage drop value of a charging pathway, and a charging threshold of the charging management chip; wherein the charging pathway is a pathway from an output end of the voltage conversion module to an input end of the charging management chip; and regulating the charging voltage output by the voltage conversion module according to the charging voltage target value.

2. The charging case according to claim 1, wherein the regulating the charging voltage output by the voltage conversion module according to the charging voltage target value comprises:

if a voltage of the charging case battery is greater than the charging voltage target value, letting the charging voltage output by the voltage conversion module be the voltage of the charging case battery, or letting the voltage conversion module perform voltage dropping to make the charging voltage be equal to the charging voltage target value;

if the voltage of the charging case battery is equal to the charging voltage target value, letting the charging voltage output by the voltage conversion module be the voltage of the charging case battery; or if the voltage of the charging case battery is less than the charging voltage target value, letting the voltage conversion module perform boosting to make the charging voltage be equal to the charging voltage target value.

3. The charging case according to claim 1, wherein the charging case comprises a memory, the memory storing therein a correspondence between the voltage drop value of the charging pathway and the voltage value of the battery of the to-be-charged device; and wherein the calculating a charging voltage target value comprises: searching a voltage drop value of the charging pathway corresponding to the current voltage value of the battery of the to-be-charged device to serve as the current voltage drop value of the charging pathway.

4. The charging case according to claim 1, wherein the voltage conversion module comprises a voltage conversion chip, a first resistor, a second resistor, a controlled switch, and a positive contact and a negative contact configured for connection with the to-be-charged device;

the voltage conversion chip and the controlled switch are in parallel connection and are respectively connected between a positive electrode of the charging case battery and the positive contact, an input end of the voltage conversion chip being connected with the positive electrode of the charging case battery, and an output end of the voltage conversion chip being connected with the positive contact;

the output end of the voltage conversion chip is connected with one end of the first resistor, the other end of the first resistor is connected with a first end of the second resistor, and a second end of the second resistor is grounded, a voltage feedback end of the voltage conversion chip is connected with the first end of the second resistor;

the control module is connected respectively with an enabling end of the voltage conversion chip, a control end of the controlled switch, and a resistance regulating end of the second resistor; and a negative electrode of the charging case battery is connected with the negative contact.

5. The charging case according to claim 4, wherein the control module is configured such that:

if a voltage of the charging case battery is greater than or equal to a charging voltage target value, the control module controls the voltage conversion chip to stop operation and controls the controlled switch to be switched on; and if the voltage of the charging case battery is less than the charging voltage target value, the control module controls the controlled switch to be switched off, and the control module controls the voltage conversion chip to boost and regulates the resistance of the second resistor, so as to let the charging voltage be equal to the charging voltage target value.

6. The charging case according to claim 4, wherein the second resistor is a digital resistor or a digital potentiometer.

7. The charging case according to claim 1, wherein the voltage conversion module comprises a voltage conversion chip, a third resistor, a fourth resistor, a resistor-capacitor network, a controlled switch, and a positive contact and a negative contact configured for connection with the to-be-charged device;

the voltage conversion chip and the controlled switch are in parallel connection, and are respectively connected between a positive electrode of the charging case battery and the positive contact; an input end of the voltage conversion chip is connected with the positive electrode of the charging case battery, and an output end of the voltage conversion chip is connected with the positive contact;

the output end of the voltage conversion chip is connected with one end of the third resistor, the other end of the third resistor is connected with a first end of the fourth resistor, and a second end of the fourth resistor is grounded, a voltage feedback end of the voltage conversion chip being connected with the first end of the fourth resistor;

the resistor-capacitor network is connected between a pulse signal output end of the control module and the first end of the fourth resistor;

the control module is connected respectively with an enabling end of the voltage conversion chip, and a control end of the controlled switch a negative electrode of the charging case battery is connected with the negative contact.

8. The charging case according to claim 7, wherein the control module is configured such that:

if a voltage of the charging case battery is greater than or equal to a charging voltage target value, the control module controls the voltage conversion chip to stop operation and controls the controlled switch to be switched on; and if the voltage of the charging case battery is less than the charging voltage target value, the control module controls the controlled switch to be switched off, and the control module controls the voltage conversion chip to boost and regulates a duty ratio of a pulse signal output by the control module, so as to let the charging voltage be equal to the charging voltage target value.

9. The charging case according to claim 7, wherein the resistor-capacitor network comprises a fifth resistor, a sixth resistor, and a first capacitor;

the fifth resistor and the sixth resistor are connected in series between the pulse signal output end of the control module and the first end of the fourth resistor; and one end of the first capacitor is connected between the fifth resistor and the sixth resistor, and the other end of the first capacitor is grounded.

10. The charging case according to claim 1, wherein the voltage conversion module comprises a voltage conversion chip, a seventh resistor, an eighth resistor, a ninth resistor, a controlled switch, a digital-to-analog conversion unit, and a positive contact and a negative contact configured for connection with the to-be-charged device;

the voltage conversion chip and the controlled switch are in parallel connection, and are respectively connected between a positive electrode of the charging case battery and the positive contact; an input end of the voltage conversion chip is connected with the positive electrode of the charging case battery, and an output end of the voltage conversion chip is connected with the positive contact;

the output end of the voltage conversion chip is connected with one end of the seventh resistor, the other end of the seventh resistor is connected with a first end of the eighth resistor, and a second end of the eighth resistor is grounded; a voltage feedback end of the voltage conversion chip is connected with the first end of the eighth resistor;

a digital regulating signal output end of the control module is connected with an input end of the digital-to-analog conversion unit, an output end of the digital-to-analog conversion unit is connected with one end of the ninth resistor, and the other end of the ninth resistor is connected with the first end of the eighth resistor;

the control module is connected with an enabling end of the voltage conversion chip, and a control end of the controlled switch respectively, a negative electrode of the charging case battery is connected with the negative contact.

11. The charging case according to claim 10, wherein the control module is configured such that:

if a voltage of the charging case battery is greater than or equal to a charging voltage target value, the control module controls the voltage conversion chip to stop operation and controls the controlled switch to be switched on;

if the voltage of the charging case battery is less than the charging voltage target value, the control module controls the controlled switch to be switched off, and the control module controls the voltage conversion chip to boost and regulates magnitude of a voltage output by the digital-to-analog conversion unit, so as to let the charging voltage be equal to the charging voltage target value.

12. The charging case according to claim 1, wherein the voltage conversion module comprises a voltage conversion chip, a tenth resistor, an eleventh resistor, a twelfth resistor, a digital-to-analog conversion unit, and a positive contact and a negative contact configured for connection with the to-be-charged device;

an input end of the voltage conversion chip is connected with a positive electrode of the charging case battery, and an output end of the voltage conversion chip is connected with the positive contact;

the output end of the voltage conversion chip is connected with one end of the tenth resistor, the other end of the tenth resistor is connected with a first end of the eleventh resistor, and a second end of the eleventh resistor is grounded; a voltage feedback end of the voltage conversion chip is connected with the first end of the eleventh resistor;

a digital regulating signal output end of the control module is connected with an input end of the digital-to-analog conversion unit, an output end of the digital-to-analog conversion unit is connected with one end of the twelfth resistor, and the other end of the twelfth resistor is connected with the first end of the eleventh resistor;

the control module is connected with an enabling end of the voltage conversion chip;

a negative electrode of the charging case battery is connected with the negative contact.

13. The charging case according to claim 12, wherein the control module is configured to:

control the voltage conversion chip to operate, and output a digital adjusting signal to let a charging voltage output by the voltage conversion chip be the charging voltage target value.

\* \* \* \* \*